US010713663B2

(12) United States Patent
Lazzouni et al.

(10) Patent No.: US 10,713,663 B2
(45) Date of Patent: Jul. 14, 2020

(54) PRODUCT AUTHENTICATION USING BARCODE CHARACTERISTICS

(71) Applicant: Authentix, Inc., Addison, TX (US)

(72) Inventors: Mohamed Lazzouni, Addison, TX (US); Will Ewin, Addison, TX (US); Jamie Kawabata, Addison, TX (US)

(73) Assignee: Authentix, Inc., Addison, TX (US)

( * ) Notice: Subject to any disclaimer, the term of this patent is extended or adjusted under 35 U.S.C. 154(b) by 114 days.

(21) Appl. No.: 15/372,160

(22) Filed: Dec. 7, 2016

(65) Prior Publication Data

US 2017/0286735 A1    Oct. 5, 2017

Related U.S. Application Data

(60) Provisional application No. 62/314,737, filed on Mar. 29, 2016.

(51) Int. Cl.
*G06K 7/10* (2006.01)
*G06Q 30/00* (2012.01)

(52) U.S. Cl.
CPC .................. *G06Q 30/018* (2013.01)

(58) Field of Classification Search
CPC ............ G06Q 30/018; G06Q 30/0185; G06K 19/06028; G06K 7/10722; G06K 7/1404; G06K 7/1413; G06K 7/1417; G06K 7/1426; G06K 7/1439; G06K 7/1447
See application file for complete search history.

(56) References Cited

U.S. PATENT DOCUMENTS

| 6,612,494 B1 * | 9/2003 | Outwater ................. B41M 3/14 235/462.01 |
| 7,441,704 B2 * | 10/2008 | Ross ................ G06K 19/06009 235/454 |
| 9,519,942 B2 * | 12/2016 | Soborski ............... G06T 1/0042 |
| 2003/0136837 A1 * | 7/2003 | Amon ....................... G07D 7/04 235/435 |

(Continued)

FOREIGN PATENT DOCUMENTS

WO    WO 2010012046 A1 *   2/2010   .......... G01N 21/643

OTHER PUBLICATIONS

Filing Receipt and Specification of U.S. Appl. No. 62/314,737, filed Mar. 29, 2016, entitled, "Android Ring Light Authenticator," 5 pages.

*Primary Examiner* — Thien M Le
*Assistant Examiner* — April A Taylor
(74) *Attorney, Agent, or Firm* — Conley Rose, P.C.; Rodney B. Carroll

(57) ABSTRACT

An apparatus comprising: a memory; and a processor coupled to the memory and configured to: obtain an image of a barcode from a product, wherein the barcode comprises a signature; obtain a notification associated with authentication of the product based on the signature; and provide the notification as an audio, a video, or a combination of audio and video. A method comprising: obtaining a smart device; coupling a scanner system to the smart device; obtaining a product comprising a barcode; scanning, using the scanner system, the barcode to obtain an image of the barcode, wherein the barcode comprises a signature; and obtaining, using the smart device and based on the signature, a notification associated with authentication of the product.

16 Claims, 12 Drawing Sheets

(56) References Cited

U.S. PATENT DOCUMENTS

| | | | |
|---|---|---|---|
| 2007/0221732 A1* | 9/2007 | Tuschel | G06K 19/06037 235/462.01 |
| 2007/0241177 A1* | 10/2007 | Tuschel | G06K 19/06028 235/375 |
| 2009/0001164 A1* | 1/2009 | Brock | G07D 7/0043 235/462.01 |
| 2013/0132292 A1* | 5/2013 | Lamb | G06Q 30/018 705/318 |
| 2013/0282601 A1* | 10/2013 | Pieri | G06Q 30/0185 705/318 |
| 2014/0095398 A1* | 4/2014 | Lin | G06Q 30/0185 705/318 |
| 2015/0235235 A1* | 8/2015 | Koren | G06Q 30/0185 705/318 |
| 2016/0162907 A1* | 6/2016 | Liu | G06K 7/10722 235/462.41 |
| 2016/0314474 A1* | 10/2016 | Schibi | G06Q 30/018 |
| 2017/0032382 A1* | 2/2017 | Shulman | G06Q 30/06 |
| 2017/0154343 A1* | 6/2017 | Kozlowski | G06Q 30/0185 |

* cited by examiner

PRODUCT AUTHENTICATION USING BARCODE CHARACTERISTICS

CROSS-REFERENCE TO RELATED APPLICATIONS

This application claims priority to U.S. provisional patent application No. 62/314,737 filed on Mar. 29, 2016 by Will Ewin, et al., and titled "Android Ring Light Authenticator," which is incorporated by reference.

TECHNICAL FIELD

Generally, the present disclosure relates to product authentication. More specifically, the present disclosure relates to product authentication using barcode characteristics.

BACKGROUND

Authentication is a process of confirming an identity of a person or thing. Authentication has applications in computing, information, manufacturing, packaging, human physical access, and consumer products. Authentication varies in its effectiveness. On one end of a spectrum, some forms of authentication can ensure absolute or near-absolute authenticity. On another end of the spectrum, some forms of authentication can ensure less than absolute authenticity or an acceptable level of authenticity. The tradeoff between the two ends of the spectrum may depend on complexity, ease of use, and cost.

SUMMARY

The present disclosure relates to apparatuses, systems, and methods for product authentication using barcode characteristics. Aspects and embodiments of the invention are set forth in the claims.

In one embodiment, the disclosure includes an apparatus comprising: a memory; and a processor coupled to the memory and configured to: obtain an image of a barcode from a product, wherein the barcode comprises a signature; obtain a notification associated with authentication of the product based on the signature; and provide the notification as an audio, a video, or a combination of audio and video.

In another embodiment, the disclosure includes a system comprising: a shroud comprising: a plurality of light sources; and a diffraction grating; a communication interface configured to receive data and power from a smart device; and a circuit board coupled to the communication interface and the shroud and configured to: receive, from the smart device and via the communication interface, an instruction to emit light; and cause, based on the instruction, the light sources to emit lights to illuminate a barcode to produce reflected lights, wherein the diffraction grating is configured to produce diffracted lights based on the reflected lights, and wherein the shroud is configured to direct the diffracted lights towards a camera in the smart device in order to produce image data comprising spatial data and a signature.

In yet another embodiment, the disclosure includes a method comprising: receiving, from a smart device, an authentication request message comprising image data of a barcode associated with a product; extracting the image data from the authentication request message; processing the image data to determine spatial data of the barcode and a signature of the barcode; querying a database to determine whether the database comprises a match of the spatial data and the signature; generating, in response to the authentication request message and based on the querying, an authentication response message comprising a notification; and transmitting the authentication response message to the smart device.

In yet another embodiment, the disclosure includes a computer program product comprising computer executable instructions stored on a non-transitory medium that when executed by a processor cause an apparatus to: obtain an image of a barcode from a product, wherein the barcode comprises spatial data and a signature; obtain a notification associated with authentication of the product based on the spatial data and the signature; and instruct provision of the notification as an audio, a video, or a combination of audio and video.

In yet another embodiment, the disclosure includes a method comprising: obtaining a smart device; coupling a scanner system to the smart device; obtaining a product comprising a barcode; scanning, using the scanner system, the barcode to obtain an image of the barcode, wherein the barcode comprises a signature; and obtaining, using the smart device and based on the signature, a notification associated with authentication of the product.

These and other features will be more clearly understood from the following detailed description taken in conjunction with the accompanying drawings and claims.

DETAILED DESCRIPTION

Figure 1:
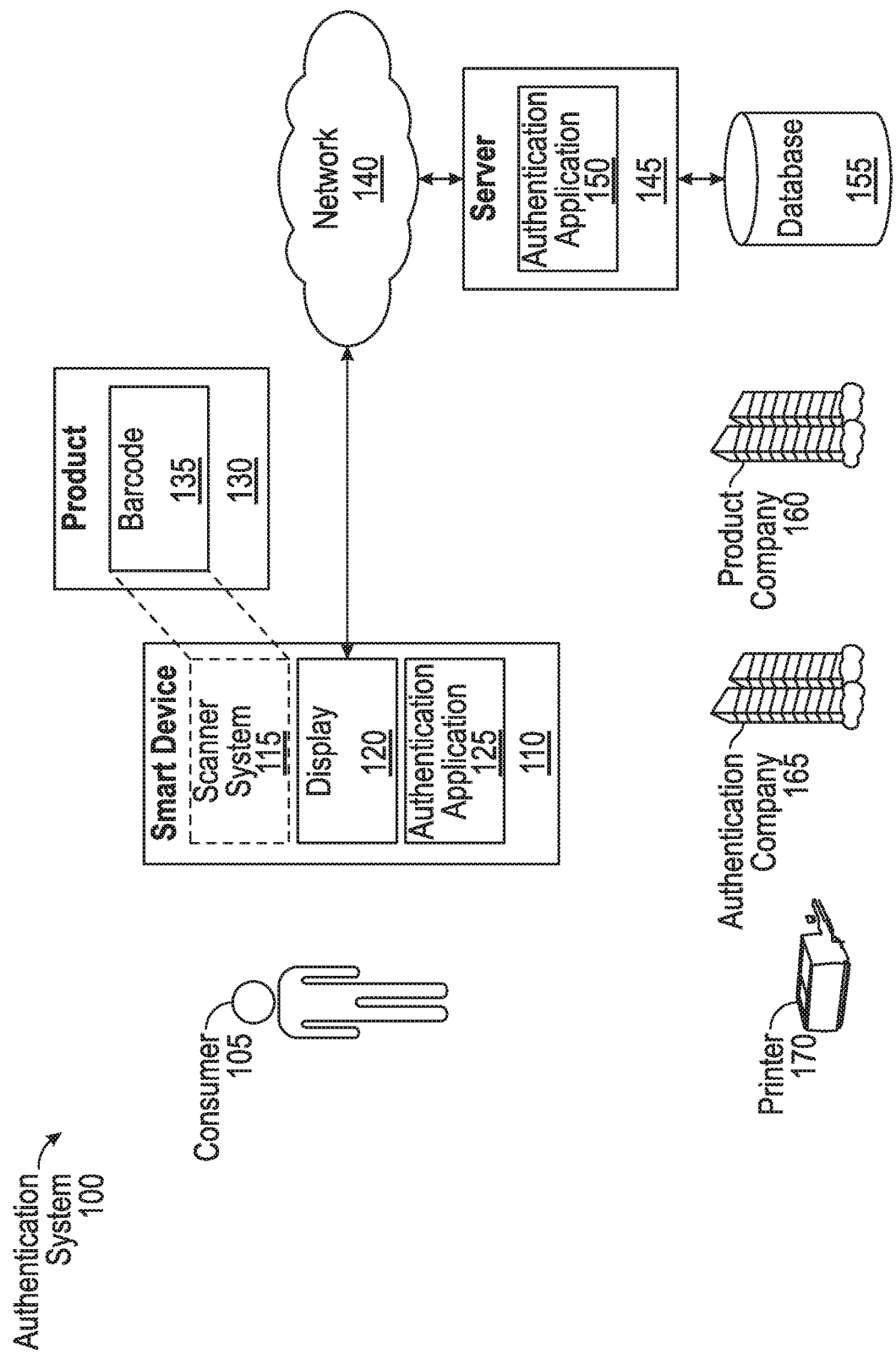
FIG. 1 is a schematic diagram of an authentication system according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations, acronyms, and initialisms apply:

ASIC: application-specific integrated circuit
CPU: central processing unit
DSP: digital signal processor
EO: electrical-to-optical
FPGA: field-programmable gate array
LAN: local area network
LCD: liquid crystal display
LED: light-emitting diode
ms: millisecond or milliseconds
NIR: near infrared
OE: optical-to-electrical
RAM: random-access memory
RF: radio frequency
ROM: read-only memory
RX: receiver
SRAM: static random-access memory
SSL: Secure Sockets Layer
TCAM: ternary content-addressable memory
TLS: Transport Layer Security
TX: transmitter
USB: Universal Serial Bus
UV: ultraviolet
WAN: wide area network
1D: one-dimensional
2D: two-dimensional
%: percent.

An important area of authentication is consumer product authentication. When consumers purchase name brand products, they typically do so with an expectation of a level of quality associated with the name brand product company. However, some companies that are not name brand product companies manufacture counterfeit products that imitate name brand products. Such counterfeit products typically do not have the same level of quality as the name brand products. It is therefore desirable for consumers to be able to authenticate products and confirm that those products are the desired name brand products. It is also desirable to authenticate the name brand products in a manner that does not significantly add to their cost. When consumers are confident that the products they purchase are authentic and have an expected level of quality, the consumers become more loyal to the product company making those products.

Disclosed herein are embodiments for product authentication using barcode characteristics. Specifically, a smart device comprises or removably couples to a scanner system that captures an image of a barcode. The smart device or a server that is remote from the smart device authenticates the image using any combination of five barcode characteristics, namely spatial data, a spatial signature, positional data, a spectral signature, and fluorescence data. The embodiments provide sufficient authentication without requiring excessive resources. For instance, at least the spatial signature and the spectral signature need not be coded into the barcode. Rather, the spatial signature and the spectral signature may be intrinsic characteristics of a printer that prints the barcode.

FIG. 1 is a schematic diagram of an authentication system 100 according to an embodiment of the disclosure. The authentication system 100 comprises a consumer 105, a smart device 110, a product 130, a network 140, a server 145, a database 155, a product company 160, an authentication company 165, and a printer 170. The authentication system 100 is simplified for ease of understanding and may therefore comprise additional components that are not shown.

The consumer 105 possesses the smart device 110 and the product 130. The consumer 105 desires to authenticate the product 130 using the smart device 110 as described below. The consumer 105 may do so at a point of sale prior to purchasing the product 130 or at home or another location after purchasing the product 130.

The smart device 110 is any smart device or other apparatus that obtains, stores, and communicates data. For instance, the smart device 110 is a mobile phone, a tablet computer, or a notebook computer. The smart device 110 comprises a scanner system 115, a display 120, and an authentication application 125. The scanner system 115 scans a barcode 135 of the product 130 as described below. The scanner system 115 has a dashed line to indicate that the scanner system 115 comprises components that are part of the smart device 110, but also components that may removably couple to the smart device 110. Any combination of the product company 160, the authentication company 165, and a third-party company creates the scanner system 115. The display 120 is any display that provides graphical information in response to commands from the smart device 110, including the authentication application 125. The display 120 may be a touchscreen display. The authentication application 125 functions as described below. The authentication company 165 creates and distributes the authentication application 125.

The product 130 is any consumer product. For instance, the product 130 is a handbag, an article of clothing, or an electronic good. The product company 160 creates the product 130 or obtains the product 130 from a third-party company that creates the product 130. The product 130 comprises the barcode 135. The barcode 135 is any optical, machine-readable representation of data relating to the product 130. The product company 160 prints the barcode 135 using the printer 170. Alternatively, the authentication company 165 or a third-party company prints the barcode 135 using the printer 170, and the product company 160 obtains the barcode 135 from the authentication company 165 or the third-party company. The product company 160 then affixes the barcode 135 to, or integrates the barcode 135 into, the product 130. The product company 160 may affix the barcode 135 to any part of the product 130 using any suitable means. For instance, the product company 160 affixes the barcode 135 to a tag and ties the tag to the product 130 using a string or a plastic filament, or the product company 160 affixes the barcode 135 to a mount using stitching or other means.

The barcode 135 comprises any combination of four characteristics, namely spatial data, a spatial signature, positional data, a spectral signature, and fluorescence data. The product company 160, the authentication company 165, or a third-party company typically intentionally introduces the spatial data, the positional data, and the fluorescence data into the barcode 135. However, the product company 160, the authentication company 165, or the third-party company typically unintentionally introduces the spatial signature and the spectral signature into the barcode 135 because the spatial signature and the spectral signature are inherent characteristics of the printer 170. The spatial data may provide a lowest level of security; the spatial signature, the positional data, and the spectral signature may provide a medium level of security; and the fluorescence data may provide a highest level of security. The barcode 135 may be a 1D barcode, a 2D barcode, a Data Matrix code, a Quick Response code, or another suitable code.

Figure 2:
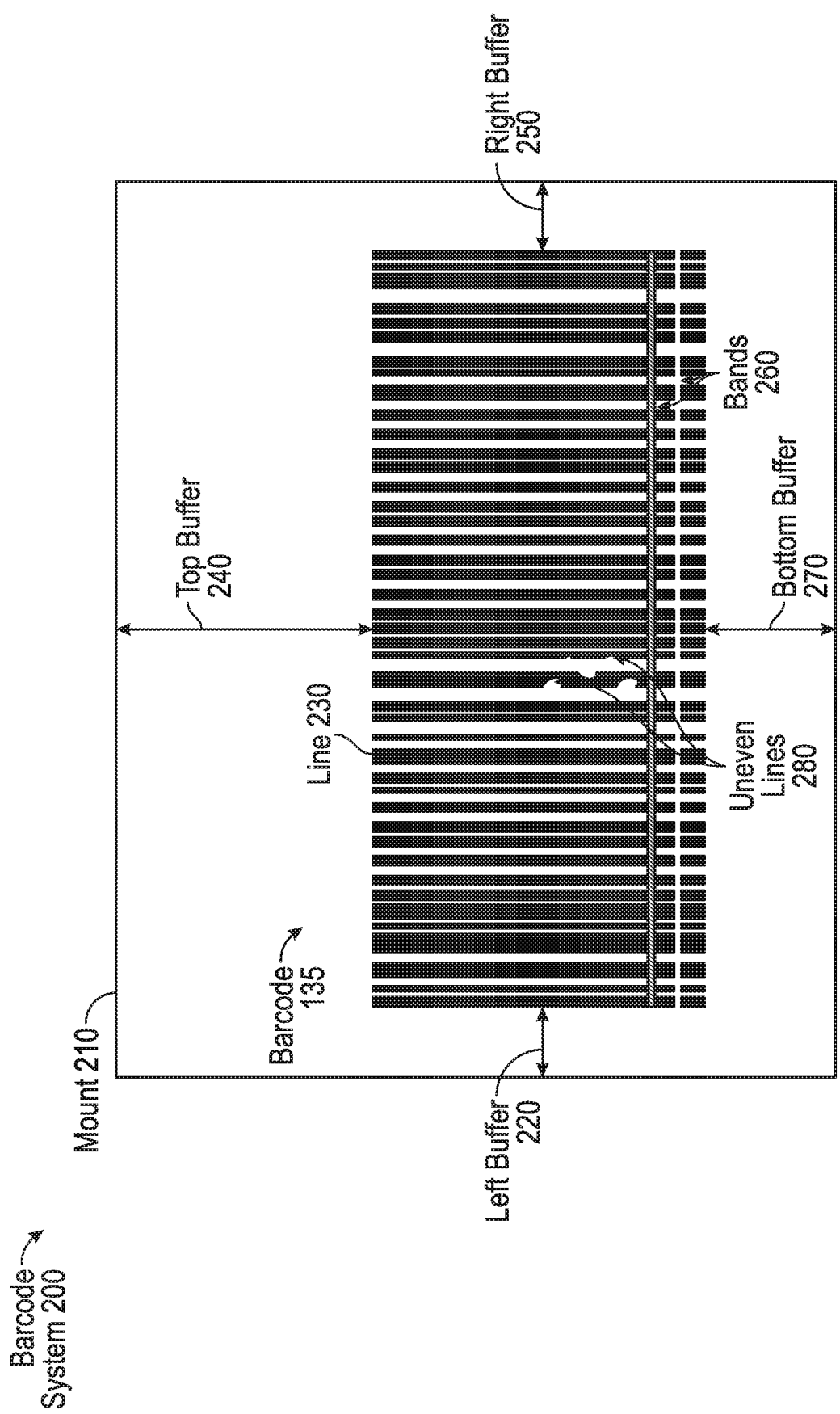
FIG. 2 is a diagram of a barcode system according to an embodiment of the disclosure.

FIG. 2 is a diagram of a barcode system 200 according to an embodiment of the disclosure. The barcode system 200 comprises a mount 210 and the barcode 135. The mount 210 provides a physical interface between the product 130 and the barcode 135. The product company 160 affixes the barcode 135 to a mount using stitching or other means. The barcode system 200 demonstrates the barcode characteristics of the barcode 135.

The spatial data refer to how lines and shapes of the barcode 135 appear and are spaced apart from each other. The spatial data are the data barcodes were originally designed for. The barcode 135 represents spatial data as a 1D barcode or a 2D barcode. A 1D barcode, or linear barcode, represents data by using various widths and spacings of parallel lines 230, which may be referred to as bars. Looking at FIG. 2, some of the lines 230 are narrower while some are wider, and some of the lines 230 are spaced closer to each other while some are spaced farther from each other. A 2D barcode, or matrix barcode, represents data by using various shapes such as rectangles, dots, and hexagons.

The spatial signature is similar to the spatial data. Specifically, the spatial signature refers to how the lines and the shapes of the barcode 135 appear and are spaced apart from each other. However, unlike the spatial data, the spatial signature is unique or substantially unique to the printer 170 due to electrical, electro-mechanical, and mechanical idiosyncrasies of the printer 170 or other reasons. The spatial signature may be referred to as an unintentional, inherent, or intrinsic characteristic of the printer 170. In other words, the product company 160, the authentication company 165, or the third-party company that prints the barcode 135 need not code the spatial signature into the barcode 135 because the spatial signature inherently occurs based on the printing process itself. As an example of a spatial signature, the printer 170 prints lines and shapes unevenly in a way that is unique or substantially unique to the printer 170. Looking at FIG. 2, uneven lines 280 exhibit uneven portions shown as white spaces. In addition, the printer 170 may modify the spatial signature by introducing spatial data in the form of perturbations to the spatial signature.

The positional data refer to the position of the barcode 135 with respect to the mount 210. Specifically, the position of the barcode 135 with respect to the mount 210 creates a left buffer 220, a top buffer 240, a right buffer 250, and a bottom buffer 270. The positional data therefore are the lengths of the left buffer 220, the top buffer 240, the right buffer 250, and the bottom buffer 270 themselves or are the relative lengths of the left buffer 220, the top buffer 240, the right buffer 250, and the bottom buffer 270 with respect to each other.

The spectral signature refers to the emittance or reflectance characteristics of the barcode 135 as a function of wavelength. The spectral signature is unique or substantially unique to the printer 170 due to electrical, electro-mechanical, and mechanical idiosyncrasies of the printer 170 or other reasons such as a type of dye that is used. The spectral signature may be referred to as an unintentional, inherent, or intrinsic characteristic of the printer 170. In other words, the product company 160, the authentication company 165, or the third-party company that prints the barcode 135 need not code the spectral signature into the barcode 135 because the spectral signature inherently occurs based on the printing process itself. As an example of a spectral signature, the printer 170 prints with banding, which refers to alternating light bands and dark bands perpendicular to a printing direction due to optical photoconducting drum imperfections, charge roller defects, polygon mirror error, gear backlash, and other imperfections. The light bands and dark bands have emittance or reflectance characteristics as a function of wavelength, and those characteristics are unique or substantially unique to the printer 170. Looking at FIG. 2, bands 260 include both a gray band and a white band. The bands 260 may appear in the visible spectrum or the non-visible spectrum.

The fluorescence data refer to how the barcode 135 fluoresces in a way that is unique or substantially unique to the barcode 135, the barcode 135 and other similar barcodes, or the printer 170. The fluorescence data may be referred to as an intentional characteristic or an extrinsic characteristic. The product company 160, the authentication company 165, or a third-party company prints the fluorophores on the barcode 135. When the barcode 135 absorbs light, the light excites the fluorophores. The fluorophores then emit photons for a fluorescence lifetime, or a tau. The fluorescence lifetime may be very short, for instance 100 ms or less. The fluorescence data may be the fluorescence lifetime or the fluorescence itself.

Returning to FIG. 1, the network 140 is any network that provides for communication among the components of the authentication system 100. Thus, the network 140 serves as an intermediary between the smart device 110 and the server 145. For instance, the network 140 is the Internet, a mobile telephone network, a LAN, or a WAN. The network 140 provides for communication along any wired or wireless channels.

The server 145 is a hardware computing device that processes data. The server 145 may be referred to as an authentication server and may be remote from the smart device 110. The server 145 comprises an authentication application 150. The authentication application 150 may be the same as the authentication application 125 in the smart device 110, but may perform different functions in the server 145. Alternatively, the authentication application 150 and the authentication application 125 are different applications that perform different functions in the server 145 and the smart device 110, respectively. The authentication application 150 functions as described below. The authentication company 165 possesses or controls the server 145, and the authentication company 165 creates and distributes the authentication application 150.

The database 155 is a hardware device, or a logical partition of a hardware device, that stores data. The server 145 and the database 155 may be separate devices or the same device. The database 155 is associated with the server 145 and the authentication application 150. Specifically, the database 155 stores and provides data at the command of the server 145 and the authentication application 150. For instance, the database 155 comprises the spatial data, the spatial signature, the positional data, the spectral signature, and the fluorescence data of barcodes such as the barcode 135. If the product company 160 or a third-party company prints the barcode 135, then the product company 160 or the third-party company provides the spatial data, the spatial signature, the positional data, the spectral signature, and the fluorescence data to the authentication company 165 for storage in the database 155. In addition, the database 155 may comprise identification data such as identification data associated with the barcode 135 and identifying the product 130. For instance, the identification data identify with text a type of the product 130 such as a handbag, a sub-type of the product 130 such as a tote, a brand of the product 130 such as Gucci, a line of the product such as the Marmont line, or the product 130 itself such as the black Marmont leather shoulder bag. The identification data may also comprise a product image of the product 130 or a similar product. The product company 160 or the third-party company provides the identification data to the authentication company 165 for storage in the database 155. The authentication company 165 possesses or controls the database 155.

The product company 160 sells the product 130. The product company 160 may also create the product 130 and print the barcode 135 using the printer 170. The authentication company 165 creates and distributes the authentication applications 125, 150 and possesses or controls the server 145 and the database 155.

The printer 170 is an inkjet printer, a laser printer, an LCD printer, an LED printer, or another printer suitable for printing the barcode 135. The printer 170 prints the barcode 135 with any combination of the spatial data, the spatial signature, the spectral signature, and the fluorescence data. The product company 160, the authentication company 165, or a third-party company possesses or controls the printer 170.

Figure 3A:
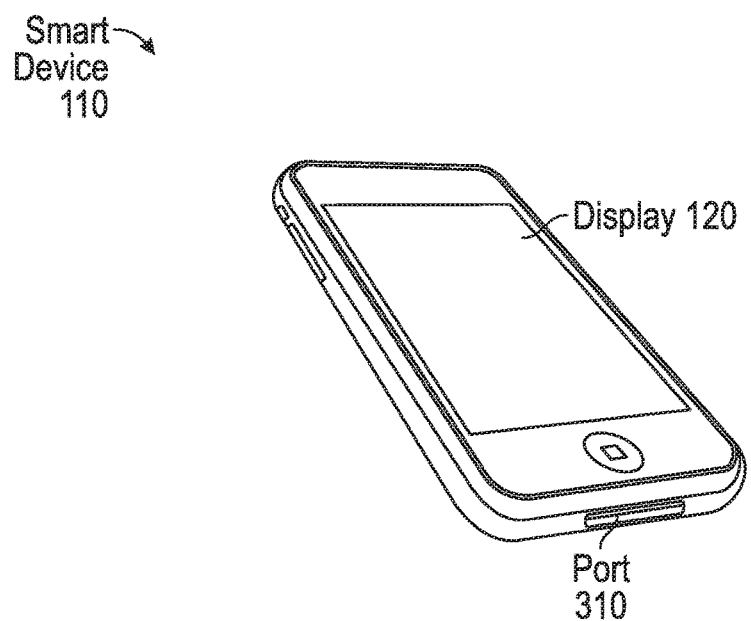
FIG. 3A is a perspective view of the smart device in FIG. 1.

FIG. 3A is a perspective view of the smart device 110 in FIG. 1. FIG. 3A shows that the smart device 110 comprises the display 120 from FIG. 1, as well as a port 310, which is a component of the scanner system 115. The port 310 is a USB port, a Lightning port, or another data and power port.

Figure 3B:
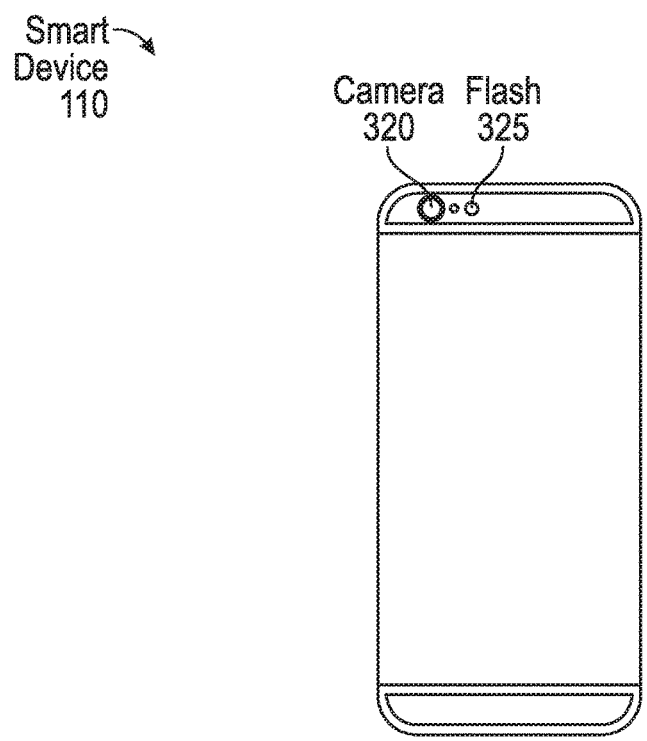
FIG. 3B is a back view of the smart device in FIG. 1.

FIG. 3B is a back view of the smart device 110 in FIG. 1. FIG. 3A shows that the smart device 110 comprises a camera 320 and a flash 325, which are components of the scanner system 115. The camera captures light in the visible wavelength spectrum. The flash 325 emits white light.

Figure 3C:
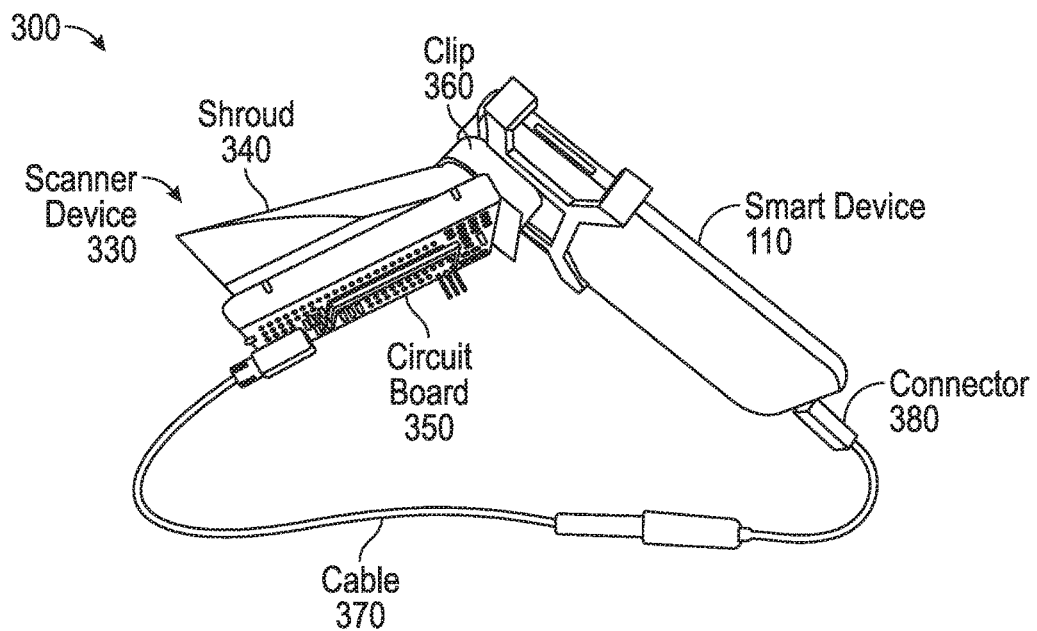
FIG. 3C is a perspective view of the smart device and a part of the scanner system 15 in FIG. 1.

FIG. 3C is a perspective view 200 of the smart device 110 and a part of the scanner system 115 in FIG. 1. FIG. 3C shows that the scanner system 115 comprises a scanner device 330, a cable 370, and a connector 380, which removably couple to the smart device 110. The scanner device 330 comprises a shroud 340, a circuit board 350, and a clip 360. The shroud 340 concentrates illuminated light on the barcode 135 and limits or eliminates ambient light from outside the shroud 340 when the shroud 340 is placed against another object such as a tag comprising the barcode 135.

The circuit board 350 couples to the shroud 340 and receives data and power from the smart device 110 via the cable 370, the connector 380, and the port 310. The clip 360 couples to the shroud 340 and provides removable coupling to the smart device 110 using brackets, teeth, glue, tape, magnetism, a hook and loop fastener, or other securing means. The clip 360 may be adjustable so that it fits the smart device 330 and other smart devices of other shapes and sizes. The cable 370 is a USB cable, a Lightning cable, or another cable that communicates data and provides power. The connector 380 is a USB connector, a Lightning connector, or another connector that removably couples the cable 370 to the port 310. Alternatively, the circuit board 350 may receive data from the smart device 110 through an RF interface, an optical interface, or another suitable communication interface. Though not shown, a cover or a housing may cover all or part of the shroud 340, the circuit board 350, and the clip 360 for design appeal or other purposes.

Figure 4A:
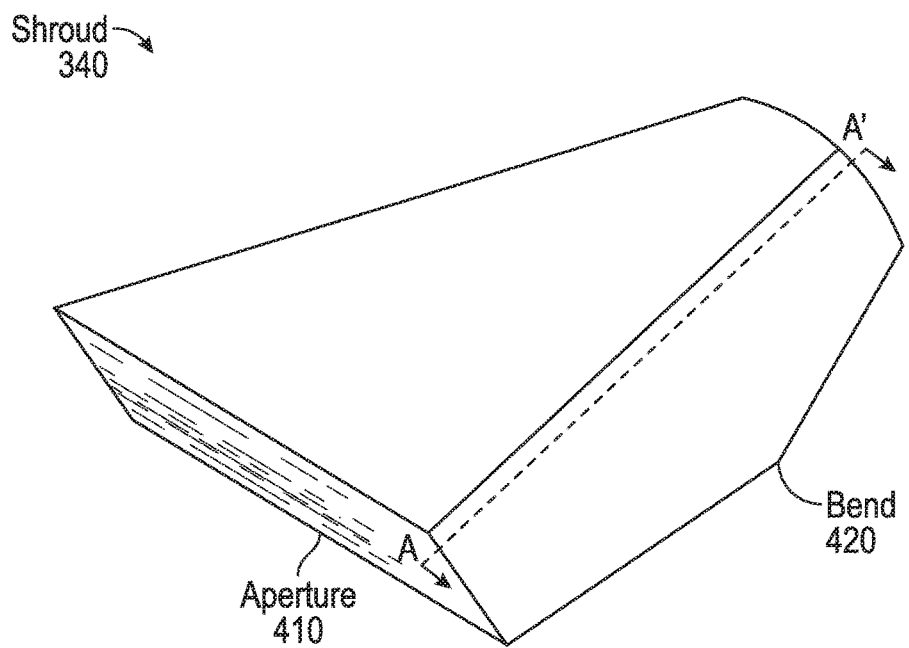
FIG. 4A is a top perspective view of the shroud in FIG. 3C.

FIG. 4A is a simplified top perspective view of the shroud 340 in FIG. 3C. FIG. 4A shows that the shroud 340 is substantially hollow and comprises an aperture 410 and a bend 420. The shroud 340 is substantially hollow in order to cover or substantially cover the product 130, the barcode 135, and the mount 210. A perimeter of the aperture 410 is substantially flat so that the aperture 410 may lie flat against a surface such as a tag or the mount 210 so that the shroud 340 concentrates illuminated light on the barcode 135 and limits or eliminates ambient light from outside the shroud 340. The bend 420 ensures that light passing through it strikes a diffraction grating, which is described below with respect to FIG. 4B, at a particular angle in order to cause a desired diffraction and to create a split view of both a diffracted spectral view and an undistorted visible view.

Figure 4B:
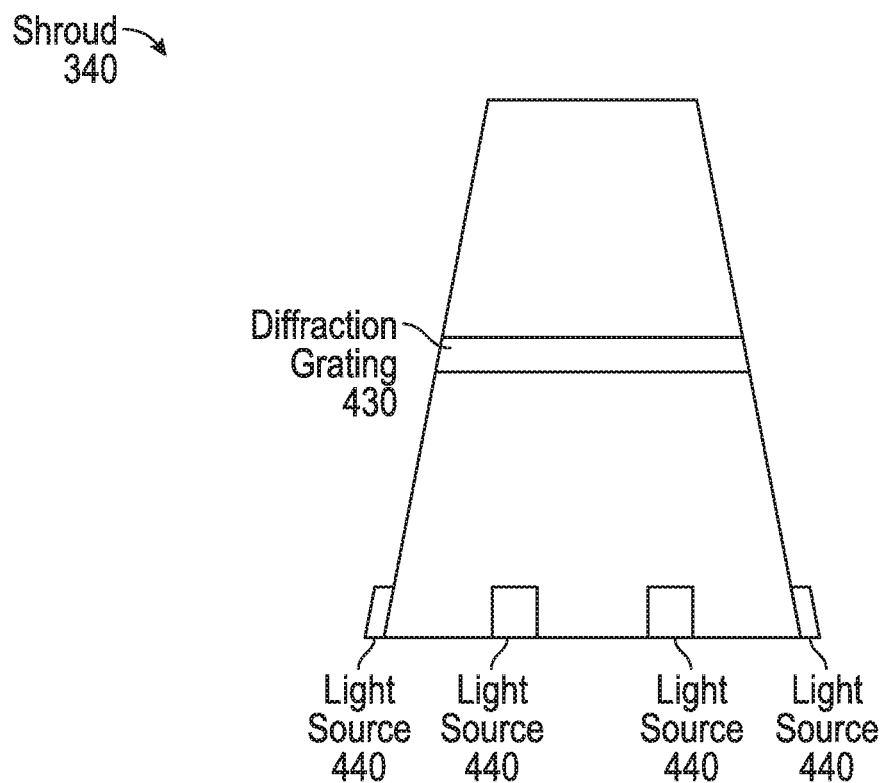
FIG. 4B is a top cross-sectional view of the shroud in FIG. 3C.

FIG. 4B is a top cross-sectional view of the shroud 340 in FIG. 3C. The cross-sectional view in FIG. 4B is taken along the A-A' cut line in FIG. 4A. FIG. 4B shows that the shroud 340 comprises a diffraction grating 430 and light sources 440. The diffraction grating 430 comprises a periodic structure of parallel, closely-spaced slits that separate light reflected from the barcode 135 into different wavelengths. The light sources 440 couple to the circuit board 350 to receive power from the circuit board 350 and emit light that illuminates the barcode 135. The light sources 440 may be LEDs, lasers, or other suitable light sources. Though the light sources 440 are present in FIG. 4A, the light sources 440 are not shown in FIG. 4A for purposes of simplification.

Figure 4C:
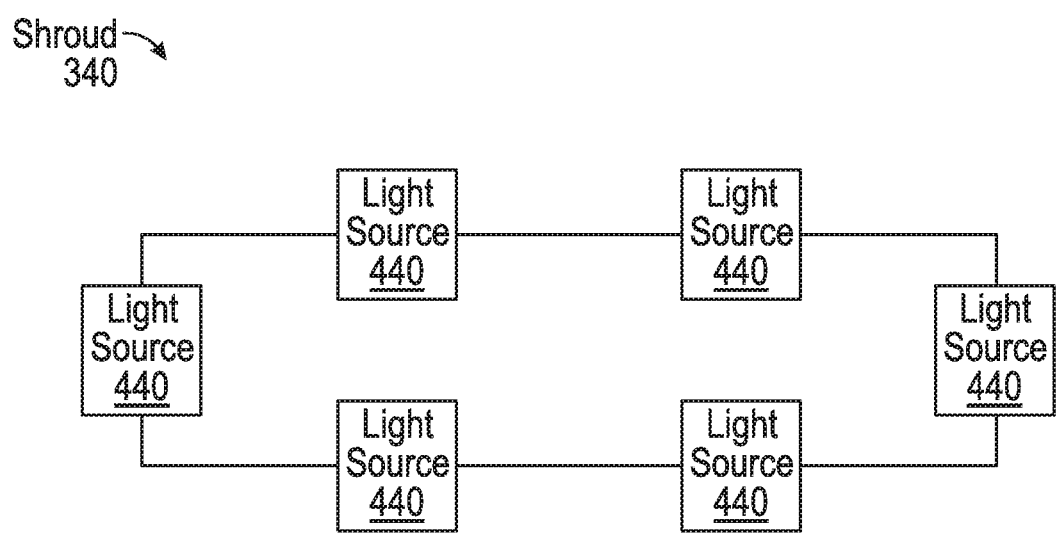
FIG. 4C is a front view of the shroud in FIG. 3C.

FIG. 4C is a front view of the shroud 340 in FIG. 3C. FIG. 4C shows that the shroud 340 may comprise six light sources 440. The light sources 440 may, for instance, comprise a red light source, a yellow light source, a green light source, a blue light source, a UV light source, and an NIR light source. Though not shown in FIGS. 3A-3C, the shroud 340 may comprise optical filters that receive lights from the light sources 440 and pass lights at more narrow wavelengths. The optical filters may also receive lights reflected from the barcode 135, remove incidental lights, and pass lights at more narrow wavelengths.

Figure 5:
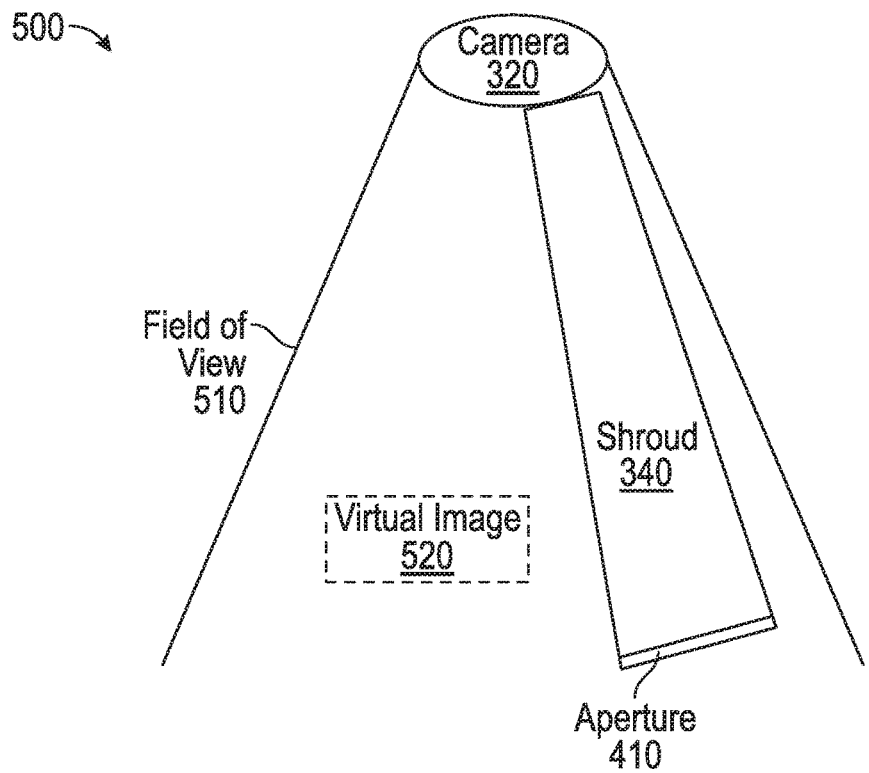
FIG. 5 is an optical diagram according to an embodiment of the disclosure.

FIG. 5 is an optical diagram 500 according to an embodiment of the disclosure. The optical diagram 500 shows a field of view 510 of the camera 320. Furthermore, the optical diagram 500 shows that the shroud 340 is positioned so that both the aperture 410 of the shroud 340 and a virtual image 520 are in a field of view 510 of the camera 320. The light sources 440 emit lights, which reflect off of the barcode 135 to provide reflected lights. The reflected lights diffract across the diffraction grating 430 to provide diffracted lights. The diffracted lights form the virtual image 520. Virtual images are optical images formed at locations where light appears to converge. Virtual images form from diverging lenses or by placing an object inside a focal length of a converging lens. In contrast, real images are optical images formed at locations where light actually converges. Real images form by placing an object outside the focal length of a converging lens.

Figure 6:
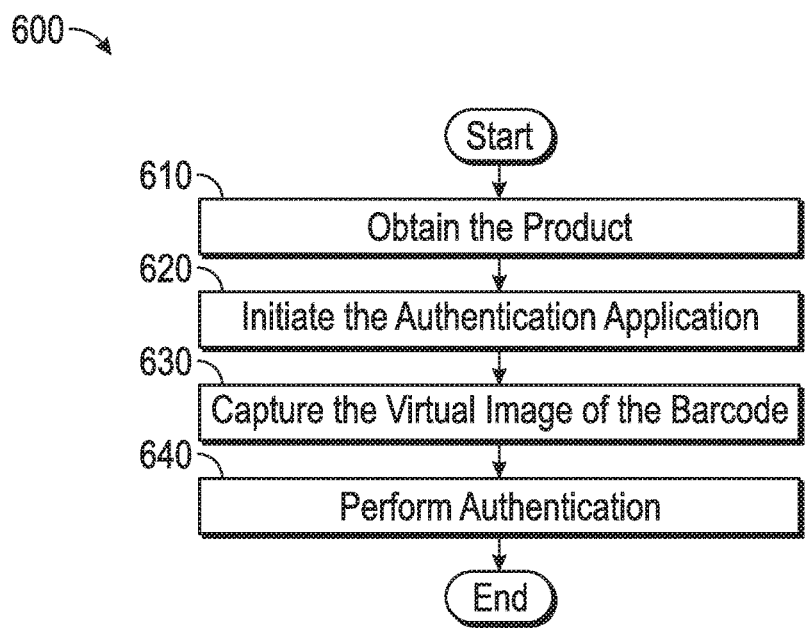
FIG. 6 is a method of product authentication according to an embodiment of the disclosure.

FIG. 6 is a method 600 of product authentication according to an embodiment of the disclosure. At step 610, the consumer 105 obtains the product 130. The consumer 105 does so by purchasing the product 130 at a store or online. Alternatively, the consumer 105 obtains the product 130 prior to purchasing it in order to authenticate it.

Figure 7A:
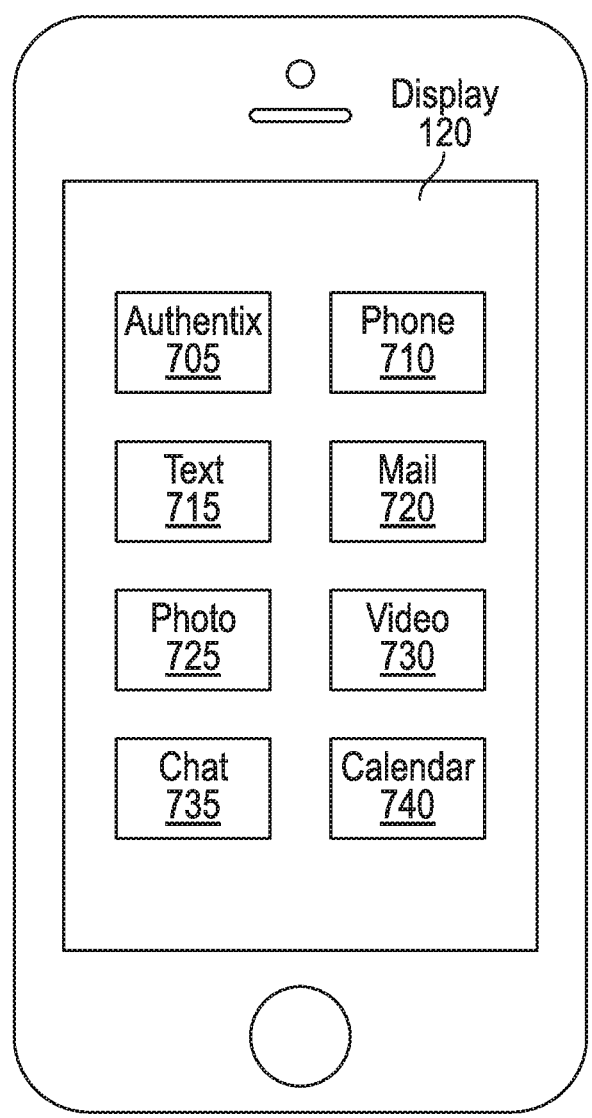
FIG. 7A is a diagram of the display of the smart device in FIG. 1 displaying a home screen of the smart device.

At step 620, the consumer 105 initiates the authentication application 125. FIG. 7A is a diagram of the display 120 of the smart device 110 in FIG. 1 displaying a home screen of the smart device 110. The home screen displays applications, including an Authentix application 705, which is the authentication application 125, as well as a phone application 710, a text application 715, a mail application 720, a photo application 725, a video application 730, a chat application 735, and a calendar application 740. To initiate the authentication application 125, the consumer 105 presses a portion of the display 120 displaying the authentication application 125.

Figure 7B:
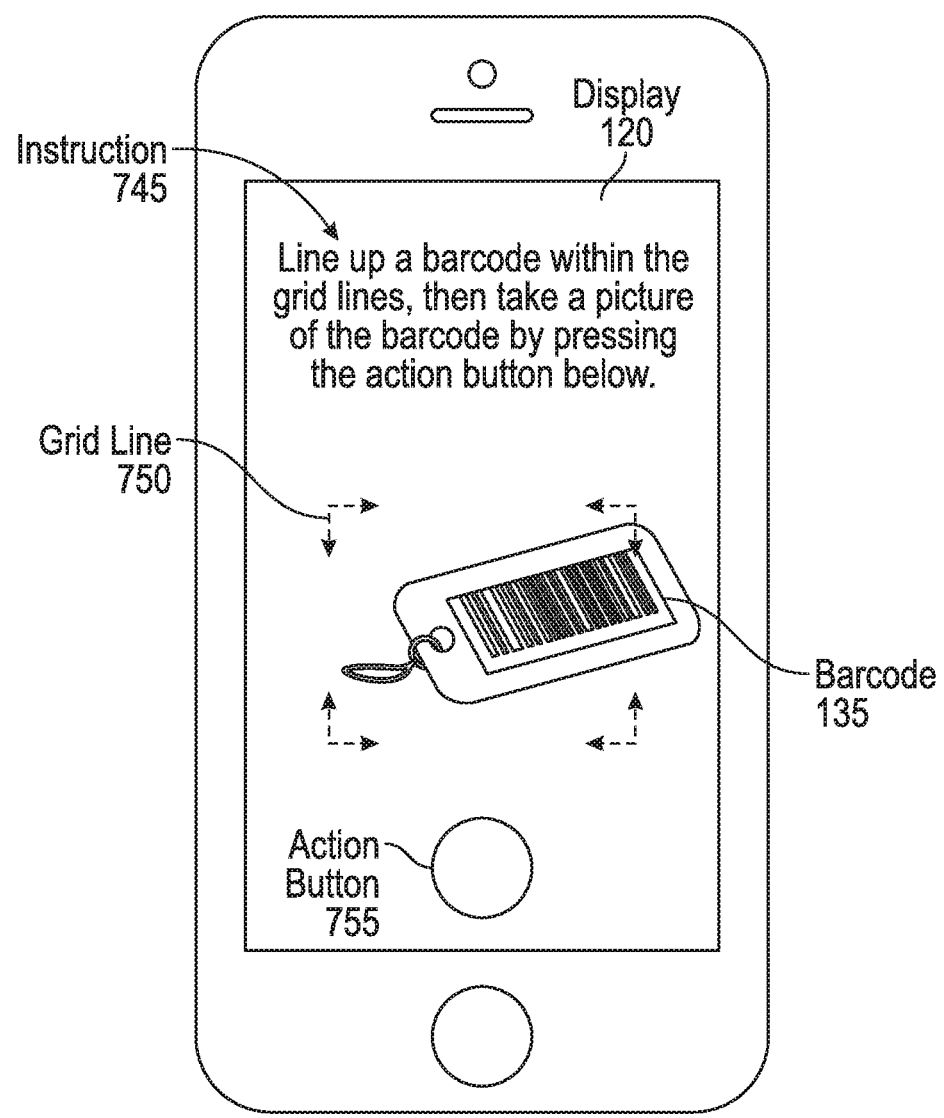
FIG. 7B is a diagram of the display of the smart device in FIG. 1 displaying an instruction screen of the authentication application.

Returning to FIG. 6, at step 630, the camera 320 captures the virtual image 520 of the barcode 135. FIG. 7B is a diagram of the display 120 of the smart device 110 in FIG. 1 displaying an instruction screen of the authentication application 125. The authentication application 125 displays an instruction 745, grid lines 750, and an action button 755. The instruction 745 may instruct the consumer 105 to "Line up a barcode within the grid lines, then take a picture of the barcode by pressing the action button below." The consumer 105 covers the barcode 135 with the shroud 340 of the scanner device 330 and attempts to line up the barcode 135 within the grid lines 750. The display 120 displays what is in the field of view 510 of the camera 320. Because the shroud 340 of the scanner device 330 may cover the barcode 135 and limit or eliminate ambient light from outside the shroud 340, the authentication application 125 may instruct the light sources 440 to emit a white light in order to illuminate the barcode 135. The lights sources 440 may emit a white light by simultaneously emitting red, green, and blue lights. Alternatively, the authentication application 125 instructs the flash 325 to emit a white light in order to illuminate the barcode 135. FIG. 7B shows the barcode 135 slightly to the right of the grid lines 750, so the consumer 105 either moves the barcode 135 to the left and within the grid lines 750 or angles or moves the camera 320 so that the grid lines encompass the barcode 135. Once the barcode 135 is within the grid lines 750, the consumer 105 presses a portion of the display 120 displaying the action button 755.

When the consumer 105 does so, the authentication application 125 instructs the light sources 440 to stop emitting the white light and begin emitting additional lights, which the light sources 440 may do in a sequence. For instance, the red light source 340 emits a red light, then the yellow light source 340 emits a yellow light, then the green light source 340 emits a green light, then the blue light source 340 emits a blue light, then the UV light source 340 emits a UV light, and finally the NIR light source 340 emits an NIR light. The shroud 340 concentrates the emitted, illuminated light on the barcode 135 and limits or eliminates ambient light from outside the shroud 340. The lights reflect off of the barcode 135 to provide reflected lights. The reflected lights diffract across the diffraction grating 430 to provide diffracted lights. The diffracted lights form the virtual image 520, which the camera 320 captures. If the authentication application 125 is attempting to authenticate the fluorescence data, then the authentication application 125 may take multiple such virtual images.

Returning to FIG. 6, finally, at step 640, the smart device 110, the server 145, and the database 155 perform authentication of the product 130. The authentication application 125 in the smart device 110 processes the virtual image 520 to obtain image data and generates an authentication request message comprising the image data and the control data. The control data are any control data suitable for facilitating communication across the network 140. At the instruction of the authentication application 125, the smart device 110 transmits the authentication request message to the server 145 via the network 140. A channel between the smart device 110 and the server 145 may be a secure channel using, for instance, SSL or TLS.

The server 145 receives the authentication request message. The authentication application 150 in the server 145 extracts the image data from the authentication request message and processes the image data to determine any combination of the spatial data, the spatial signature, the positional data, the spectral signature, and the fluorescence data. The authentication application 150 queries the database 155 to determine whether the database 155 comprises a match of the spatial data, the spatial signature, the positional data, the spectral signature, or the fluorescence data. The authentication application 150 may make that determination within an error range. For instance, the authentication application 150 may determine that the spectral signature of the barcode 135 is at least a 95% match of the spectral signature in the database 155. The match percentage may vary.

Figure 7C:
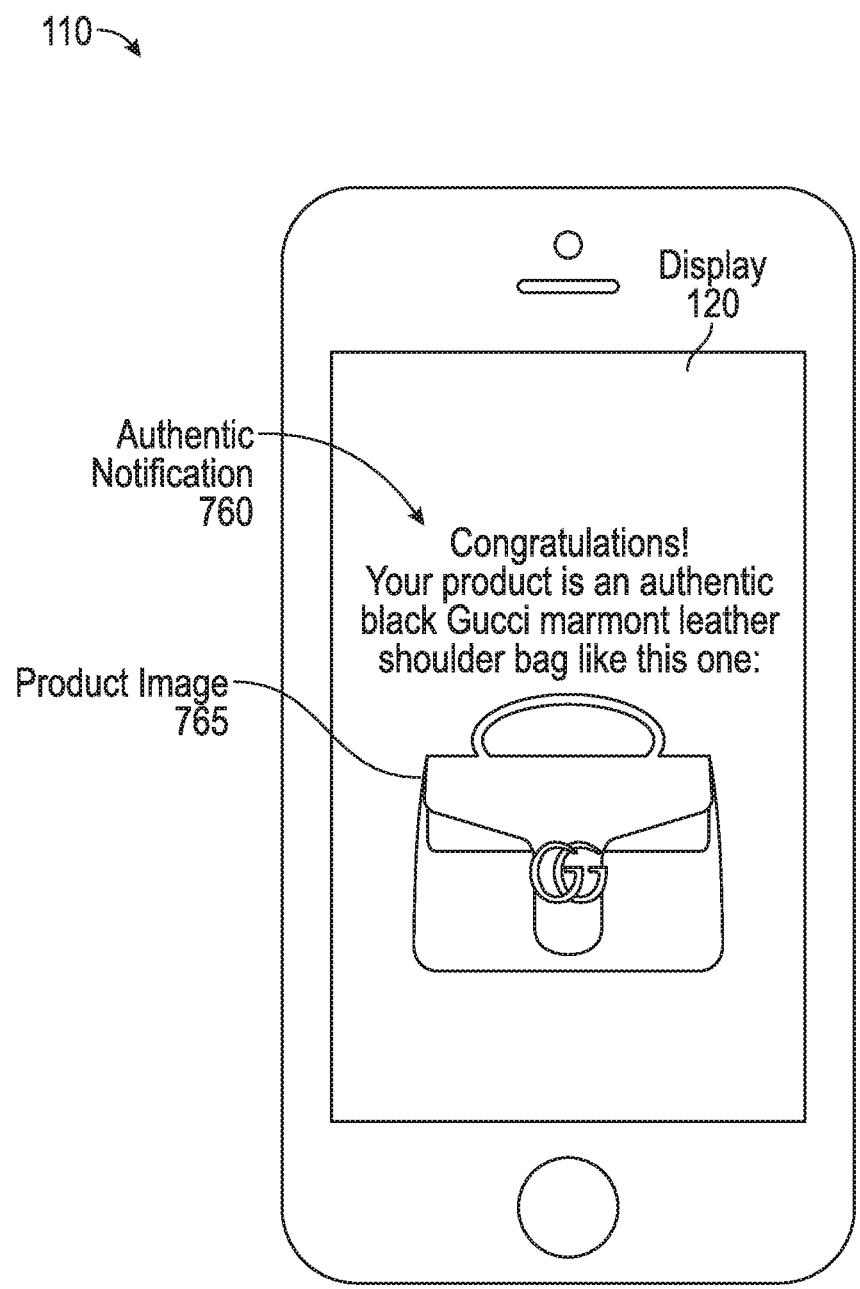
FIG. 7C is a diagram of the display of the smart device in FIG. 1 displaying an authentic notification screen of the authentication application.

Upon finding a match, the authentication application 150 generates an authentic notification indicating that the barcode 135, and thus the product 130, are authentic. FIG. 7C is a diagram of the display 120 of the smart device 110 in FIG. 1 displaying an authentic notification screen of the authentication application 125. The display 120 shows an example authentic notification 660 and a product image 765. The authentic notification 660 reads "Congratulations! Your product is an authentic black Gucci Marmont leather shoulder bag like this one." The product image 765 is an image of the product 130 or a similar product. In addition, the authentication application 150 may query the database 155 for identification data associated with the spatial data, the spatial signature, the positional data, the spectral signature, or the fluorescence data. The identification data identify any combination of the type of the product 130, the sub-type of the product 130, the brand of the product 130, the line of the product, or the product 130 itself, and the identification data may comprise the product image 765. Thus, the presence and the content of the authentic notification 660 and the product image 765 depend on the identification data.

Figure 7D:
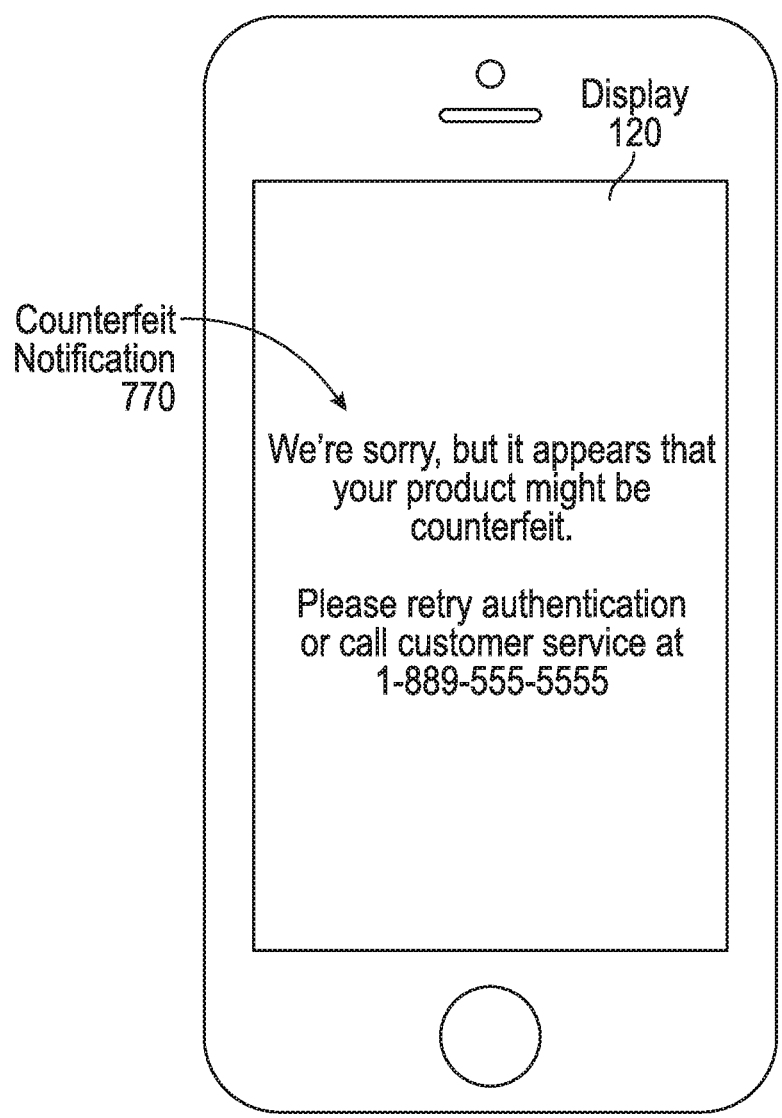
FIG. 7D is a diagram of the display of the smart device in FIG. 1 displaying a counterfeit notification screen of the authentication application.

Upon finding no match, the authentication application 150 generates a counterfeit notification indicating that the barcode 135, and thus the product 130, are counterfeit. FIG. 7D is a diagram of the display 120 of the smart device 110 in FIG. 1 displaying a counterfeit notification screen of the authentication application 125. The display 120 shows an example counterfeit notification 770. The counterfeit notification 770 reads "We're sorry, but it appears that your product might be counterfeit. Please retry authentication or call customer service at 1-889-555-5555." In addition, upon finding no match, the authentication application 150 may add to a counterfeit log a location of the smart device 110 and other data associated with the smart device 110. At the instruction of the authentication application 150, the server 145 transmits the log to a server associated with the product company 160. The product company 160 may use the log to determine approximately where counterfeiting is occurring, approximately where counterfeit products are sold, and which products are being counterfeited.

The authentication application 150 generates an authentication response message comprising either the authentic notification 660 or the counterfeit notification 770 and comprising control data. The control data are any control data suitable for facilitating communication across the network 140 and may be the same as the control data in the authentication request message. At the instruction of the authentication application 150, the server 145 transmits the authentication response message to the smart device 110 via the network 140.

The authentication application 125 in the smart device 110 receives the authentication response message and processes the authentication response message. At the instruction of the authentication application 125, the smart device 110 displays either the authentic notification 660 or the counterfeit notification 770 on the display 120. Alternatively, the smart device 110 plays an audio that reads either the authentic notification 660 or the counterfeit notification 770, and the smart device 110 displays the product image 765 on the display 120. Alternatively, the smart device 110 provides a combination of both audio and video. For instance, the audio is a congratulatory note or a string of such notes, and the video is either the authentic notification 660 or the counterfeit notification 770. If the smart device 110 displays or plays the authentic notification, then the consumer 105 may continue to use the product 130. If the smart device 110 displays or plays the counterfeit notification, then the consumer 105 may retry authentication, choose not to buy the product 130, call customer service, or return the product 130.

Seven embodiments for implementing the method 600 are described as follows. In a first embodiment, the smart device 110 itself performs all of step 640. In that case, the authentication application 125 in the smart device 110 comprises the data that the database 155 would otherwise comprise. Thus, the authentication application 125 processes the image data to determine any combination of the spatial data, the spatial signature, the positional data, the spectral signature, and the fluorescence data. The authentication application 125 queries a database in the smart device 110 to determine whether the database comprises a match of the spatial data, the spatial signature, the positional data, the spectral signature, or the fluorescence data. Based on that determination, the authentication application 125 generates either the authentic notification 660 or the counterfeit notification 770. In response to a schedule, requests from the consumer 105, prompts from the authentication application 150 in the server 145, or other events, the authentication application 125 in the smart device 110 updates its database in order to obtain up-to-date spatial data, spatial signatures, positional data, spectral signatures, and fluorescence data. The authentication application 125 then continues step 640 as described above.

In a second embodiment, the authentication request message comprises other data associated with the product 130. For instance, the consumer 105 types in, selects, or speaks user-identified data identifying the product that the consumer 105 is attempting to authenticate. The authentication application 125 in the smart device 110 may provide a searchable database for typing in the user-identified data, browsing categories or drop-down menus for selecting the user-identified data, or a microphone button to initiate a microphone for speaking the user-identified data. For instance, the user-identified data identify a black leather purse. The authentication application 150 in the server 145 compares the user-identified data to the spatial data. If the database 155 comprises an association between the user-identified data and the spatial data, then the authentication application 150 continues the method 600 by querying the database 155 to determine whether the database 155 comprises a match of the spatial signature, the positional data, the spectral signature, or the fluorescence data as described above. If the database 155 does not comprise an association between the user-identified data and the spatial data, then the authentication application 150 continues step 640 by generating the counterfeit notification 770.

In a third embodiment, the authentication application 150 in the server 145 first queries the database 155 to determine whether the database 155 comprises a match of the spatial data. If there is a match of the spatial data, then the authentication application 150 next queries the database 155 to determine whether the database 155 comprises a match of the spatial signature, the positional data, the spectral signature, or the fluorescence data as described above. If there is not a match of the spatial data, then the authentication application 150 instructs the database 155 to store information identifying the smart device 110 and to store the spatial data. In addition, the authentication application 150 instructs the database 155 to increment a failure counter and to associate the failure counter with both the information identifying the smart device 110 and the spatial data. Once the failure counter reaches a preset threshold, the authentication application 150 rejects additional authentication request messages from the smart device 110 or additional authentication request messages with the same spatial data. Furthermore, the authentication application 150 continues step 640 by generating the counterfeit notification 770.

In a fourth embodiment, the authentication application 125 performs a local check of the image data before generating the authentication request message and transmitting the authentication request message to the server 145. The local check may verify a checksum associated with the image data. If the local check verifies the checksum, then the method 600 continues to step 640 by generating the authentication request message and transmitting the authentication request message to the server 145. If the local check does not verify the checksum, then, at the instruction of the authentication application 125, the smart device displays an error notification on the display 120. The consumer 105 may retry authentication, choose not to buy the product 130, call customer service, or return the product 130.

In a fifth embodiment, the authentication company 165 prints a digital signature in the spatial data of the barcode 135 or prints a watermark in spectral data of the barcode 135. Alternatively, the authentication company 165 prints a joint signature in both the spatial data and the spectral data. The digital signature, the watermark, and the joint signature may be referred to as validation keys. In contrast to the spatial signature and the spectral signature, the authentication company 165 intentionally introduces the validation keys. The authentication company 165 maintains validation keys in the database 155. In response to a schedule, determined weaknesses in the validation keys, or other events, the authentication company 165 replaces the validation keys with new validation keys. The authentication application 125 in the smart device 110 or the authentication application 150 in the server 145 validates the validation keys as described above.

In a sixth embodiment, the scanner system 115 or the authentication application 125 in the smart device 110 intentionally distorts the image data to create distorted image data. The distorted image data comprise both distorted data and the image data. As an example, the scanner system 115 comprises an optical component such as an LCD panel that implements a pattern that blocks physical areas of the lights emitted from the light sources 440 or reflected off of the barcode 135, or the optical component implements a pattern that blocks specific wavelengths of the lights emitted from the light sources 440 or reflected off of the barcode 135. The authentication application 125 generates the authentication request message comprising the distorted image data and control data. The authentication application 150 in the server 145 knows the pattern, so the authentication application 150 is able to generate the distorted data and generate the image data from the distorted image data. The authentication application 150 therefore authenticates both the distorted data and the barcode 135.

The authentication application 125 in the smart device 110 may vary the pattern based on a date and a time of the authentication so that the distorted data form a time stamp. The authentication application 150 in the server 145 may reject any time stamps, and thus authentication request messages, from times before a preset length of time. Alternatively, the authentication application 125 in the smart device 110 requests and receives the pattern from the authentication application 150 in the server 145. The authentication application 150 in the server 145 uses the pattern only once, so if the authentication application 125 in the smart device 110 again requests a pattern, then the authentication application in the server 145 issues a new pattern and transmits the new pattern to the authentication application 125 in the smart device 110. Alternatively, the optical component implements a pattern that is static and unique to the scanner system 115. Optical components in other scanner systems implement patterns that are static and unique to those scanner systems. In that case, the optical component may be a printed film that blocks physical areas of the lights emitted from the light sources 440 or reflected off of the barcode 135, or the optical component may be a hologram that blocks physical areas in a more complex manner than the printed film, thus making replication of the distorted data difficult.

In a seventh embodiment, the authentication company 165 prints a first watermark in the spectral data of the barcode 135, and the scanner system 115 introduces a second watermark to the barcode 135 while capturing the image data using a pattern as described above. If one disassembles the scanner system 115 to determine its optical response and prints a counterfeit barcode to match the optical response, then the counterfeit barcode comprises the second watermark or a portion of the second watermark. A second scanner system would detect the second watermark in the counterfeit barcode and generate a counterfeit notification.

Figure 8:
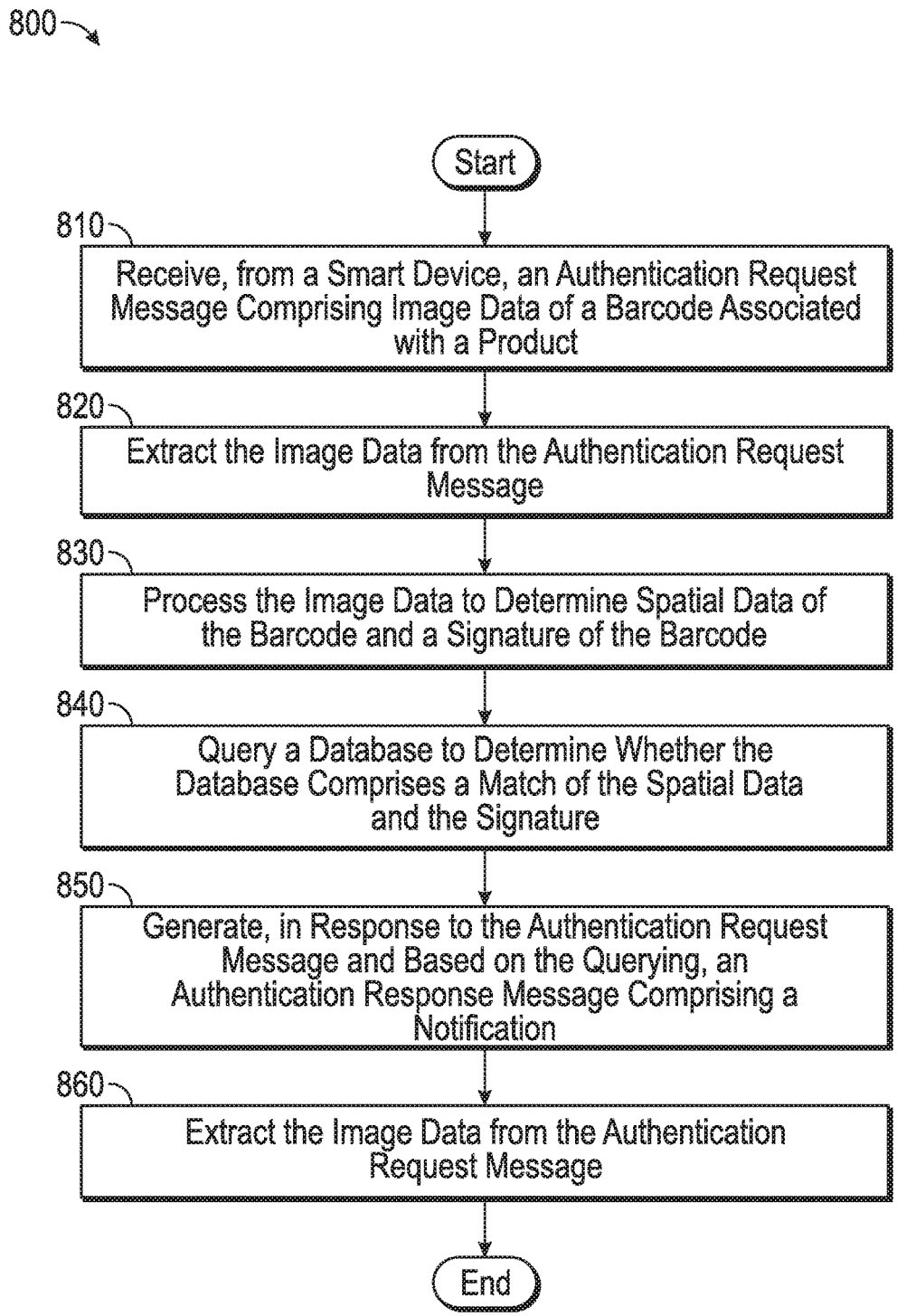
FIG. 8 is a flowchart illustrating a method of product authentication according to an embodiment of the disclosure.

FIG. 8 is a flowchart illustrating a method 800 of product authentication according to an embodiment of the disclosure. The server 145 and the authentication application 150 in the server 145 implement the method 800. At step 810, an authentication request message comprising image data of a barcode associated with a product is received from a smart device. For instance, the server 145 receives the authentication request message from the smart device 110. The image data are of the barcode 135 associated with the product 130 and may be distorted image data. At step 820, the image data are extracted from the authentication request message. For instance, the authentication application 150 extracts the image data from the authentication request message. At step 830, the image data are processed to determine spatial data of the barcode and a signature of the barcode. For instance, the authentication application 150 processes the image data. The signature is a spectral signature or a fluorescence signature. At step 840, a database is queried to determine whether the database comprises a match of the spatial data and the signature. For instance, the authentication application 150 queries the database 155. At step 850, an authentication response message comprising a notification is generated in response to the authentication request message and based on the querying. For instance, the authentication application 150 generates the authentication response message. Finally, at step 860, the authentication response message is transmitted to the smart device. For instance, at the instruction of the authentication application 150, the server 145 transmits the authentication response message to the smart device.

Figure 9:
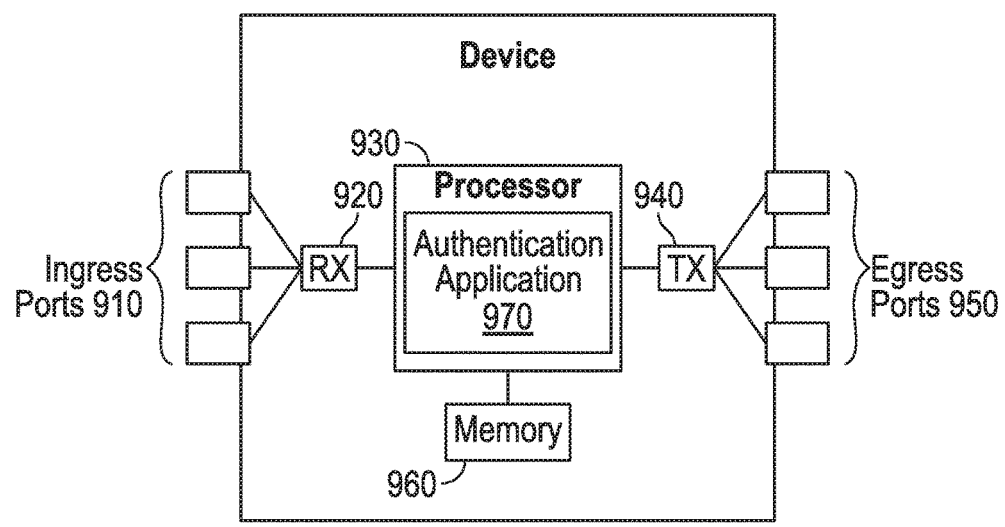
FIG. 9 is a schematic diagram of a device according to an embodiment of the disclosure.

FIG. 9 is a schematic diagram of a device 900 according to an embodiment of the disclosure. The device 900 is suitable for implementing the disclosed embodiments. The device 800 comprises ingress ports 910 and an RX 920 for receiving data; a processor, logic unit, or CPU 930 to process the data; a TX 940 and egress ports 950 for transmitting the data; and a memory 960 for storing the data. The device 900 may also comprise OE components and EO components coupled to the ingress ports 910, the RX 920, the TX 940, and the egress ports 950 for ingress or egress of optical or electrical signals.

The processor 930 is implemented by any suitable combination of hardware, middleware, firmware, and software. The processor 930 may be implemented as one or more CPU chips, cores (e.g., as a multi-core processor), FPGAs, ASICs, and DSPs. The processor 930 is in communication with the ingress ports 910, RX 920, TX 940, egress ports 950, and memory 960. The processor 930 comprises an authentication application 970. The authentication application 970 implements the disclosed embodiments. The inclusion of the authentication application 970 therefore provides a substantial improvement to the functionality of the device 900 and effects a transformation of the device 900 to a different state. Alternatively, the authentication application 970 is implemented as instructions stored in the memory 960 and executed by the processor 930.

The memory 960 comprises one or more disks, tape drives, and solid-state drives and may be used as an overflow data storage device, to store programs when such programs are selected for execution, and to store instructions and data that are read during program execution. The memory 960 may be volatile and non-volatile and may be ROM, RAM, TCAM, and SRAM.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a memory; and
   a processor coupled to the memory and configured to:
   obtain an image of a barcode from a product, wherein the barcode comprises a signature, wherein the signature is a spatial signature indicating how lines and shapes of the barcode appear and are spaced apart from each other in a way that is unique or substantially unique to a printer associated with the barcode, and wherein the spatial signature is inherent to a printing process;

obtain, from an authentication server separate from the apparatus, a notification associated with authentication of the product based on the signature, wherein, if the notification is an authentic notification indicating that the barcode and the product are authentic, then the notification comprises identification data identifying a type of the product, a sub-type of the product, a brand of the product a line of the product, or the product itself; and provide the notification as an audio, a video, or a combination of audio and video.

2. The apparatus of claim 1, wherein the signature further is a fluorescence signature indicating how the barcode fluoresces in a way that is unique to the barcode or the printer.

3. The apparatus of claim 1, wherein the processor is further configured to instruct a light source to emit a light towards the barcode.

4. The apparatus of claim 3, further comprising a camera coupled to the processor and configured to:

capture the image using a reflected light that is a reflected version of the light; and pass the image to the processor.

5. The apparatus of claim 4, wherein the processor is further configured to:

process the image to obtain image data; and generate an authentication request message comprising the image data.

6. The apparatus of claim 5, further comprising a transmitter coupled to the processor and configured to transmit the authentication request message to the authentication server for authentication of the barcode.

7. The apparatus of claim 6, further comprising a receiver coupled to the processor and configured to receive from the authentication server an authentication response message comprising the notification.

8. The apparatus of claim 5, wherein the authentication request message further comprises user-identified data identifying the product.

9. The apparatus of claim 1, wherein the notification is either the authentic notification or a counterfeit notification.

10. The apparatus of claim 1, further comprising a display coupled to the processor and configured to display the notification.

11. The apparatus of claim 1, wherein the apparatus is a mobile phone.

12. An apparatus comprising:

a memory; and a processor coupled to the memory and configured to:

obtain an image of a barcode from a product, wherein the barcode comprises a signature, wherein the signature is a spectral signature indicating emittance or reflectance characteristics of the barcode that are unique or substantially unique to a printer associated with the barcode, and wherein the spectral signature is inherent to a printing process;

obtain, from an authentication server separate from the apparatus, a notification associated with authentication of the product based on the signature, wherein, if the notification is an authentic notification indicating that the barcode and the product are authentic, then the notification comprises identification data identifying a type of the product, a sub-type of the product, a brand of the product a line of the product, or the product itself; and provide the notification as an audio, a video, or a combination of audio and video.

13. A method implemented by an authentication server, the method comprising:

receiving, from a smart device separate from the authentication server, an authentication request message comprising image data of a barcode associated with a product and comprising user-identified data identifying the product;

extracting the image data from the authentication request message;

processing the image data to determine spatial data of the barcode and a signature of the barcode;

comparing the user-identified data to the spatial data;

determining whether a database comprises an association between the user-identified data and the spatial data;

querying, when the database comprises the association, the database to determine whether the database further comprises a match of the spatial data and the signature;

generating, in response to the authentication request message and based on the querying, an authentication response message comprising a notification, wherein the notification is a counterfeit notification indicating that the barcode and the product are counterfeit;

adding, in response to the notification being the counterfeit notification and independent of user input, a location of the smart device to a counterfeit log; and transmitting the authentication response message to the smart device.

14. The method of claim 13, further comprising transmitting the counterfeit log to a product company associated with the product.

15. A computer program product comprising computer executable instructions stored on a non-transitory medium that when executed by a processor cause an apparatus to:

obtain an image of a barcode from a product, wherein the barcode comprises spatial data and a signature, wherein the signature is a spatial signature indicating how lines and shapes of the barcode appear and are spaced apart from each other in a way that is unique or substantially unique to a printer associated with the barcode, and wherein the spatial signature is inherent to a printing process;

obtain, from an authentication server separate from the apparatus, a notification associated with authentication of the product based on the spatial data and the signature, wherein, if the notification is an authentic notification indicating that the barcode and the product are authentic, then the notification comprises identification data identifying a type of the product, a sub-type of the product, a brand of the product, a line of the product, or the product itself; and instruct provision of the notification as an audio, a video, or a combination of audio and video.

16. A method comprising:

obtaining a smart device;

coupling a scanner system to the smart device;

obtaining a product comprising a barcode;

scanning, using the scanner system, the barcode to obtain an image of the barcode, wherein the barcode comprises a signature, wherein the signature is a spatial signature indicating how lines and shapes of the barcode appear and are spaced apart from each other in a way that is unique or substantially unique to a printer associated with the barcode, and wherein the spatial signature is inherent to a printing process; and obtaining, from an authentication server separate from the smart device, using the smart device, and based on the signature, a notification associated with authentication of the product, wherein the notification is an authentic notification indicating that the barcode and the product are authentic, and wherein the notification comprises identification data identifying a type of the product, a sub-type of the product, or a line of the product.

\* \* \* \* \*